(No Model.) 5 Sheets—Sheet 1.

M. C. BULLOCK.
PORTABLE DERRICK.

No. 407,993. Patented July 30, 1889.

WITNESSES:
Wm T. Henning
O. N. Willis

INVENTOR
Milan C. Bullock
BY Dayton & Poole
ATTORNEYS (No Model.)　　　　　　　M. C. BULLOCK.　　　　5 Sheets—Sheet 2.
PORTABLE DERRICK.

No. 407,993.　　　　　　　　　　Patented July 30, 1889.

WITNESSES:　　　　　　　　　　　　INVENTOR:—
Wm. F. Henning.　　　　　　　　　　Milan C. Bullock.
O. N. Willis.
　　　　　　　　　　　　　　　　BY Dayton & Poole
　　　　　　　　　　　　　　　　ATTORNEYS (No Model.) 5 Sheets—Sheet 3.

M. C. BULLOCK.
PORTABLE DERRICK.

No. 407,993. Patented July 30, 1889.

WITNESSES:
Wm. F. Hemming
O. N. Willis

INVENTOR
Milan C. Bullock
BY Drayton & Poole
ATTORNEYS (No Model.) 5 Sheets—Sheet 4.
M. C. BULLOCK.
PORTABLE DERRICK.
No. 407,993. Patented July 30, 1889.
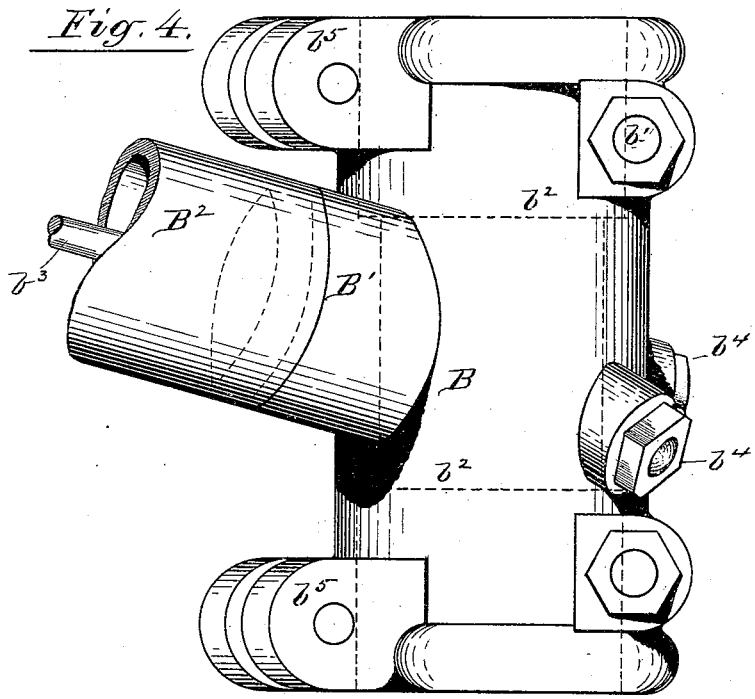
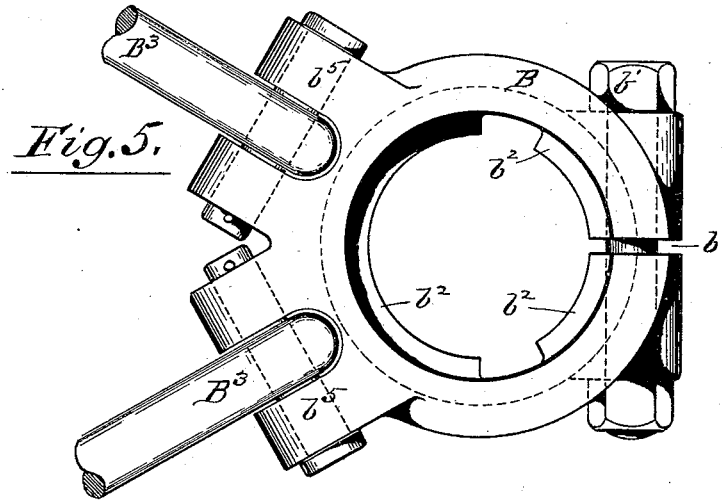
WITNESSES:
Wm F. Henning
O. N. Willis
INVENTOR
Milan C. Bullock.
BY Clayton & Poole
ATTORNEYS (No Model.) 5 Sheets—Sheet 5.
M. C. BULLOCK.
PORTABLE DERRICK.

No. 407,993. Patented July 30, 1889.

WITNESSES:
Wm. F. Heming
O. N. Willis

INVENTOR
Milan C. Bullock
BY Dayton & Poole
ATTORNEYS

UNITED STATES PATENT OFFICE.

MILAN C. BULLOCK, OF CHICAGO, ILLINOIS.

PORTABLE DERRICK.

SPECIFICATION forming part of Letters Patent No. 407,993, dated July 30, 1889.

Application filed August 15, 1887. Serial No. 247,043. (No model.)

*To all whom it may concern:*

Be it known that I, MILAN C. BULLOCK, of Chicago, in the county of Cook and State of Illinois, have invented certain new and useful Improvements in Derricks; and I do hereby declare that the following is a full, clear, and exact description thereof, reference being had to the accompanying drawings, and to the letters of reference marked thereon, which form a part of this specification.

This invention relates to a portable derrick for use in rock-drilling, well-boring, or prospecting, said derrick being adapted to be separated into parts for transportation and to be conveniently set up where it is to be used.

The invention consists in the matters hereinafter set forth, and pointed out in the appended claims.

Prior to my invention derricks for rock drilling or boring purposes have been constructed of timbers at large expense, and the derricks so constructed have been unsuited for transportation to distant points for further use.

By the present invention a relatively light and yet strong derrick is provided, which is capable of being taken down, transported, and set up again with convenience and expedition, and which may therefore be repeatedly used, with the advantage of materially lessening that expense of sinking holes which has been heretofore chargeable to temporary structures.

Figure 1:
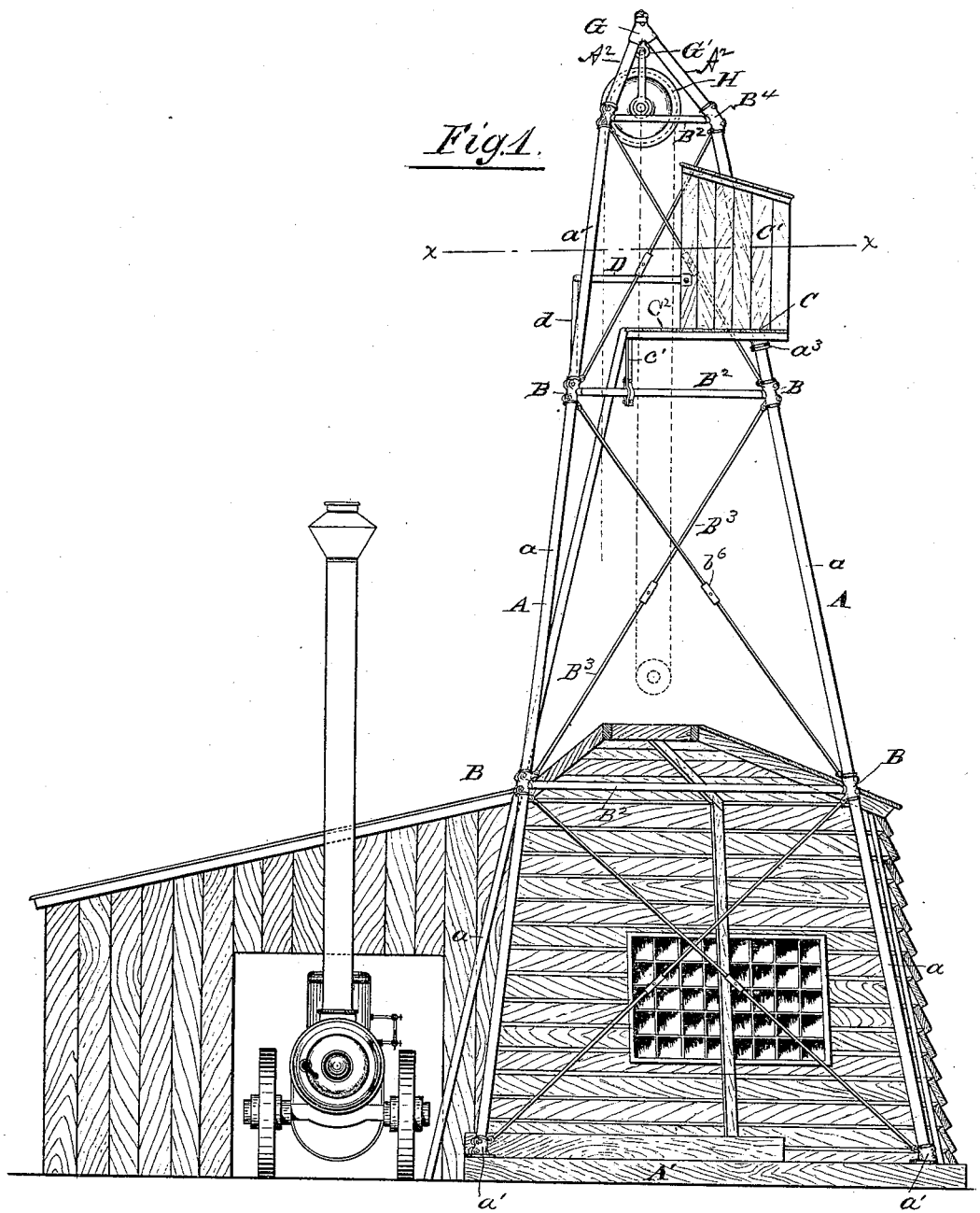
Figure 2:
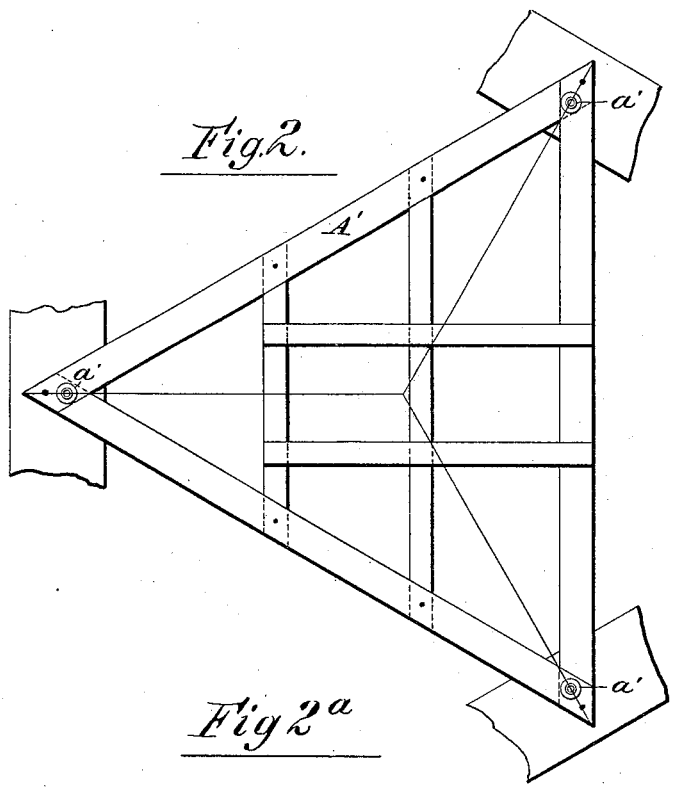
Figure 2A:
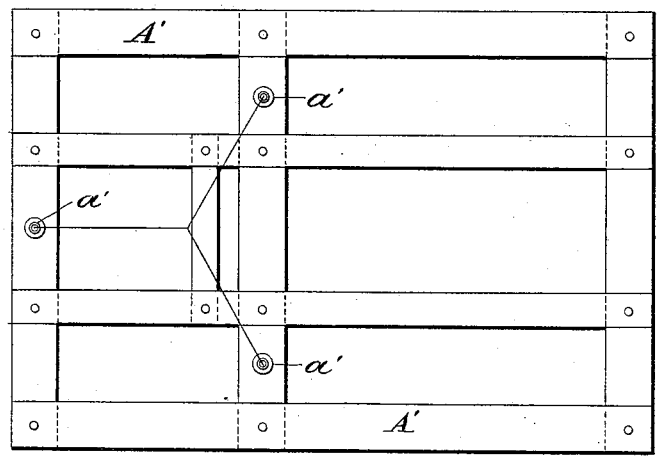
Figure 3:
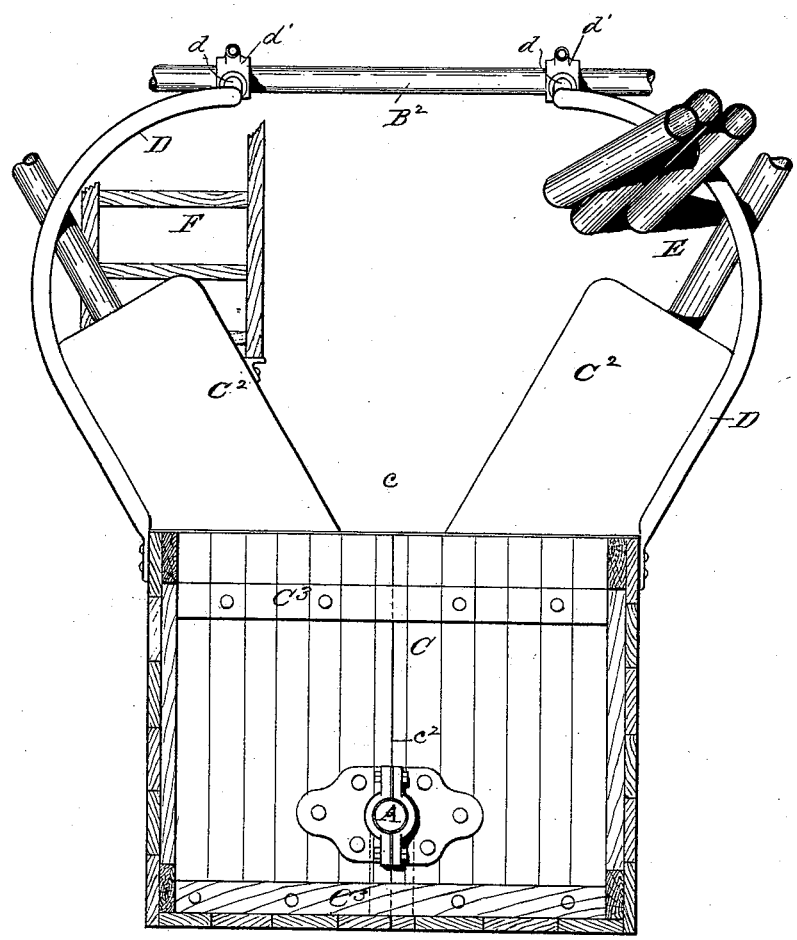
Figures 7, 8, 9:
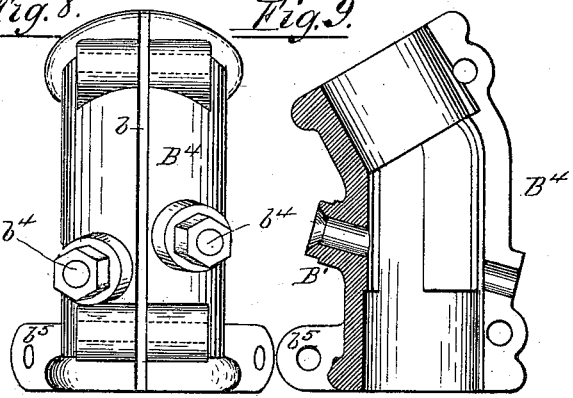
Figure 10:
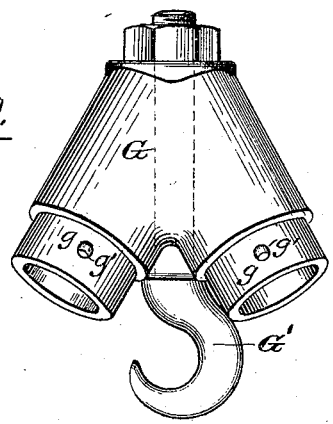
Figure 11:
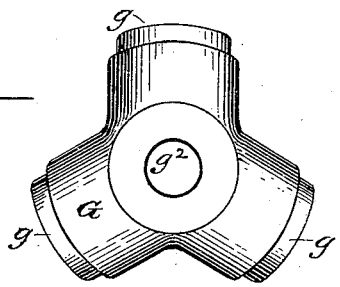

In the accompanying drawings, Figure 1 is an elevation of a derrick embodying my improvements, a house inclosing the base of the derrick and an elevated cabin being shown in vertical section. Fig. 2 is a plan of one form of base-frame upon which the posts of the derrick are erected. Fig. 2ᵃ is a plan of another form of base-frame more extensive than that shown in Fig. 2. Fig. 3 is an enlarged horizontal section in the line $x\ x$ of Fig. 1. Figs. 4 and 5 are enlarged side and plan views, respectively, of the couplings which join the sections of the uprights. Fig. 6 is an enlarged view of a portion of one of the sections of the upright. Figs. 7, 8, and 9 are enlarged side, end, and sectional elevations, respectively, of the couplings uniting the uprights proper with their prolongations. Figs. 10 and 11 are enlarged elevations and plan, respectively, of the three-branched coupling joining the upper portions of the converging prolongations of the uprights. The remaining figures are details.

The derrick-tower is constructed of tubular iron with three inclined uprights or posts located in the angles of an equilateral triangular pyramid. The several posts are composed of sections of metal tubing, as gas-pipe, and the sections are joined by couplings which are easily removed or replaced. Horizontal girts connect the posts or uprights at the couplings, and diagonal braces also connect with the couplings by means which admit of ready detachment and connection. The derrick-tower terminates at the top in a tripod the legs of which are coupled at their feet with the upper ends of the main posts, and which are more inclined from the perpendicular than said posts. The upper ends of the tripod-legs are joined in a coupling, from which depends the sheave or pulley over which the drill hoisting and lowering rope is trained. At a height from the base of the tower—say three to five feet less than the length of the drill-rods—is located a removable platform for the support of an operator whose business it is to connect and disconnect the movable sheave of the drill-rope with the upper end of the drill-rod or drill-rod sections from time to time in the course of the work. In the neighborhood of and preferably a little above this platform is located a rail or pair of rails for the lateral support of drill-rods not in use in position for the operator to reach them for the purpose of coupling or uncoupling with the drill-rope when required to do so. This rail I call a "cradle." A movable ladder or other suitable means for reaching the elevated platform from the ground is also provided. When the work of the derrick is completed, it may be disjointed and transported in a compact form as freight to any other point where it is required for use and again set up.

A rough inclosure of boards is commonly erected about the base of the derrick to shelter the workmen operating the drill, and the elevated platform will also be commonly covered by a housing for the protection of the operator there engaged. A housing of boards may also be provided adjacent to the base of the derrick to protect the engine used in working the drill.

Describing the drawings, A A, Fig. 1, represent the uprights or posts of the derrick, composed of tubular sections $a$. These uprights rest in or upon steps $a'$, secured to the base beams, boards, or timbers A'. The steps $a'$ are shown in the form of sockets adapted to admit the lower ends of the posts A, and are preferably split vertically and provided with clamp-posts by which they may be tightened upon the posts. These steps may, however, be in the form of studs entering the posts, if preferred. The base-beams form a separable base-frame, as shown in Figs. 2 and $2^a$, the beams being detachably held together by pins at their intersections, though they may be otherwise separably joined in any familiar manner. Such a base having the steps $a'$ secured thereto, when joined and resting upon the ground, definitely determines the proper position of the uprights A, and at the same time forms a suitable support for the tower. It may also support the drilling machine, if one be used.

The sections $a$ of each upright are joined by detachable metal couplings B, Figs. 4 and 5, which are split lengthwise, as shown at Fig. 9, in order that they may receive the ends of the post-sections loosely and be free to separate when the tower is to be taken down, notwithstanding the contiguous parts may be rusted from exposure. The couplings are preferably, and as a separate improvement, provided with transverse screw-threaded clamp-bolts $b'$, by which they may be clamped to the ends of the upright sections; but they may without this improvement be screw-threaded to receive correspondingly-threaded ends of the upright sections. The couplings are provided with interior transverse shoulders or projections $b^2$ between their ends to limit the entrance of the sections $a$, so as to insure the proper position of the coupling, or, if necessary, so as to leave a clear space between the ends of said sections, as indicated by dotted lines in Figs. 4 and 9, to give passage to the tie-rods $b^3$. The clamp-bolts in Figs. 4 and 5 are shown as intruding into the interior space of the coupling to be occupied by the ends of the upright sections, and in Fig. 6 a section $a$ is shown as having a notch or circumferential groove $a^2$ to receive the clamp-bolt. By this construction the section will be held more positively from withdrawal from the coupling even if not firmly clamped.

The couplings B are each provided with two short central nipples B', which project a short distance into the ends of the tubular cross-girts $B^2$, which unite the uprights. These nipples B' are placed one higher than the other, as seen in Figs. 7 and 8, and they are made hollow to give passage to the tie-rods $b^3$, which pass through the girts and couplings and receive nuts on their protruding ends, as shown at $b^4$, Fig. 4. The couplings B are also provided with pierced lugs or eyes $b^5$ to connect with the ends of diagonal braces $B^3$ by means of pins in the usual manner. These diagonal braces are provided with turn-buckles $b^6$, by which they may be tightened or adjusted.

The lengths of the upright sections $a$ are usually to be determined with reference to the length of the drill-rod sections, and are preferably chosen so as to bring the upper ends of the said drill-rod sections, when standing ready for use, within the cradle of the derrick at a point between the ends of a section of the structure, or between two adjacent sets of cross-girts $B^2$. These drill-rods are commonly composed of three sixteen-foot lengths of pipe, making a total length of forty-eight feet in each drill-section. The sections of the derrick terminating at the couplings next below the platform will therefore aggregate something less than forty-eight feet. In the drawings they are represented as being in two sections about twenty feet high each. The platform C is supported at a height of about four feet above the subjacent cross-girt $B^2$, and the cradles D are at an elevation of, say, three feet above the platform C.

The platform C is shown as constituting the floor of a cabin C', and said platform is constructed to afford a clear space or passage in the axis of the tower for the accommodation of the drill-rod or drill-rope, and it is also shown as having two side wings $C^2$ $C^2$ projecting from the floor of the cabin, with a central space $c$ between them for the drill-rope to work. These wings $C^2$ $C^2$ are upheld at their outer extremities by metal brackets $c'$, constructed to engage and rest upon the subjacent cross-girts $B^2$, and at their inner ends are desirably continuous with the cabin-floor. One of the posts A passes through the cabin-floor and upholds the same by means of a collar $a^3$, which may be either fast or detachably secured upon the post. The platform C is adapted to receive the post A through it either by being made in two parts which meet in line with the post or upright A, as shown by a full dividing line $c^2$, Fig. 3, and are rigidly joined by means of removable bolt-fastened cross-beams $C^3$ $C^3$, or the platform may be in a single piece provided with a notch or open slot to admit the post A laterally. The latter construction is indicated by dotted lines in Fig 3.

The cradles or rods D are curved, so as to cross or cut off the re-entering angles of the derrick, as seen in Fig. 3. One end of each cradle is detachably fastened to the cabin by bolts or otherwise, and the other is supported by an upright $d$, having a clamp $d'$, Figs. 1 and 3, by which it is secured to the adjacent cross-girt $B^2$. By this curved form of the cradle the drill-sections (shown at E E, Fig. 3) are supported in proper position to be conveniently reached from the wings of the platform C and coupled at their upper ends with the drill-rope by the operator standing on the platform.

F is a ladder by which the platform is reached from the ground.

$A^2$ are converging prolongations of the posts A set at a greater angle from the perpendicular than the latter and preferably at an angle of about forty-five degrees. The couplings $B^4$, by which they are joined with the posts A, are of the angular form shown in Figs. 1, 7, 8, and 9, but otherwise correspond, essentially, with the couplings B.

G is a three-branched coupling, to which all three of the converging sections $A^2$ are detachably joined. As shown in Figs. 10 and 11, it is provided with nipples $g$, which enter the tubular sections $A^2$, and with holes $g'$ to receive keys for detachably securing the coupling to the sections. As indicated in Fig. 11, the coupling G is also provided with a vertical hole $g^2$ through it to admit the shank of a hook or eye G', from which the upper sheave H of the tackle for working the drill-rod is suspended.

In setting up the derrick two posts A A may be connected by the couplings, girts, and braces while lying on the ground, and sections of the third post may be also coupled before raising. The posts being then raised, the girts and diagonals necessary to complete the derrick will be inserted, and finally the tripedal top sections $A^2$ put in place; or, if preferred, the connected posts A may be all separately raised and then joined by the girts and diagonals, or the lower sections of all the posts may be first raised and connected and the upper sections then added.

The tie-rods may be engaged otherwise with the couplings; but the form of engagement shown is preferred and is claimed as a distinct improvement.

I claim as my invention—

1. The combination, with the post-sections of a tubular iron derrick and couplings joining said sections, of tubular cross-girts between opposite couplings and tie-rods passing through said cross-girts and engaged with the couplings, the latter being provided with nipples which project into the ends of said cross-girts, substantially as described.

2. The combination, with post-sections $a$ of a tubular iron derrick and couplings having a clear space therein between the ends of said sections, of tubular cross-girts between opposite couplings and tie-rods passing through said cross-girts and through said couplings between the ends of the post-sections, said couplings being provided with nipples which project into the ends of said cross-girts, substantially as described.

3. The combination, with the post-sections $a$, of vertically-split couplings joining said sections, whereby the sections and couplings are readily detachable, substantially as described.

4. The combination, with the sections $a$ of the derrick-posts A, of longitudinally-split couplings B, provided with clamp-bolts, substantially as and for the purposes set forth.

5. The combination, with the sections $a$ of the derrick-uprights A, of longitudinally-split couplings B, provided with interior shoulders to limit the entrance of the post-sections, and provided also with clamping devices, substantially as described.

6. The combination, with a skeleton derrick having uprights A, of an elevated platform made in two parts removably joined to each other on opposite sides of one of said posts, substantially as described.

7. In combination with a skeleton derrick provided with a tool hoist or fall, an elevated platform extending on three sides of a space $c$ in vertical line with a tool-hoist, substantially as described.

8. The combination, with a skeleton derrick provided with a hoist or fall for raising and lowering the drill-rods, and with an elevated platform, of a cradle or rail arranged to laterally support the upper ends of drill-rods, substantially as described.

9. The combination, with the uprights or posts A, connected at their upper ends by horizontal ties, of the converging members $A^2$, a single-branched coupling uniting the upper ends of said members, and a hoisting and lowering tackle suspended from said branched coupling, substantially as described.

In testimony that I claim the foregoing as my invention I affix my signature in presence of two witnesses.

MILAN C. BULLOCK.

Witnesses:
M. E. DAYTON,
O. N. WILLIS.